United States Patent Office 3,847,996
Patented Nov. 12, 1974

3,847,996
PROCESS FOR PREPARATION OF CARBONYL COMPOUNDS AND ISOBUTYLENE FROM OLEFINS AND T-BUTYL ALCOHOL
Frederick F. Caserio, Jr., Laguna Beach, and Glenn M. Nakaguchi, Fullerton, Calif., assignors to Atlantic Richfield Company, Philadelphia, Pa.
No Drawing. Continuation of abandoned application Ser. No. 708,774, Feb. 28, 1968. This application June 9, 1971, Ser. No. 151,528
Int. Cl. C07c 45/02
U.S. Cl. 260—604 AC    4 Claims

ABSTRACT OF THE DISCLOSURE

A process wherein an olefin, e.g. ethylene, is catalytically oxidized in anhydrous t-butyl alcohol by a palladium catalyst to form an aldehyde or a ketone, e.g. acetaldehyde, the t-butyl alcohol being converted to isobutylene, is described.

CROSS-REFERENCE TO RELATED APPLICATION

This is a streamlined continuation of Ser. No. 708,774, filed Feb. 28, 1968, now abandoned.

A novel and improved process for regenerating the catalysts described herein is described in our copending United States patent application, Regeneration of Quinone Cooxidants, Ser. No. 708,722, filed Feb. 28, 1968, now abandoned.

BACKGROUND OF THE INVENTION

Field of the Invention

This invention relates to a process for synthesizing aldehydes or ketones from olefins and isobutylene from t-butyl alcohol.

Description of the Prior Art

A number of methods for producing aldehydes and ketones by incomplete oxidation of olefins have been proposed. For example, oxidation of ethylene to ethylene oxide by means of an argentiferous catalyst or nonsilver containing catalysts at high temperatures is known to produce mixtures of formaldehyde, acetaldehyde, formic acid, acetic acid and other products. Such processes do not produce the desired aldehyde, acetaldehyde, in good yield, however. The oxidation of ethylene or propylene with selenium dioxide, and the oxidation of monoolefins by passing a mixture of the olefin vapor with air over various catalysts at elevated temperatures is known to produce carbonyl compound along with a variety of other oxidation products but the yields are not generally attractive from a commercial point of view.

More recently, it has been discovered that olefins, e.g. ethylene, can be oxidized to the corresponding carbonyl compound by reacting the olefin with oxygen and water in the presence of a $PdCl_2$ catalyst. See, e.g., the following United States patents and the patents and publications cited therein: 3,076,032, 3,086,052, 3,086,994, 3,087,968, 3,106,579, 3,119,875, 3,131,223, 3,172,913, 3,236,897 and 3,268,590.

Processes of this type are quite specific for the production of aldehydes and have achieved a considerable degree of commercial success. However, there is no agreement as to the mechanism of the reaction involved in these processes, Smidt, Oxidation of Olefins With Palladium Chloride Catalysts, *Chemistry and Industry*, January 1962, pp. 54–61.

The reaction of olefins with palladium chloride catalysts has been described, inter alia, by Smidt, *supra*; Smidt et al., The Oxidation of Olefins With Palladium Chloride Catalysts, *Angew. Chem. internat. Edit.*, Vol. 1 (1962) pp. 80–88; and Moiseev et al., On the Mechanism of the Reaction Between Palladium Salts and Olefins in Hydroxyl-Containing Solvents, *Doklady Akademii Nauk SSSR*, Vol. 133, (1960) pp. 370–380, the discussions of which are here incorporated by reference.

Smidt, *Chemistry and Industry*, supra, describes the production of acetaldehyde as a two step reaction; (1) formation of a palladium chloride-ethylene complex and (2) hydrolysis of the complex to the end product, the oxygen being supplied by the water. Moiseev et al., *supra*, however, suggest that one hydrogen and the oxygen are supplied by the water. Moiseev et al., show the production of vinyl acetate by catalytic reaction of ethylene in glacial acetic acid using $PdCl_2$ and predict that the product of the reaction of $PdCl_2$ with ethylene in solution in alcohol would be a vinyl ether and illustrate the formation of acetal by this route by the addition of a second molecule of alcohol to the vinyl ether.

The production of vinyl ethers and acetals, along with minor quantities of aldehydes, e.g. acetaldehyde, is described in Netherlands Pat. No. 6,411,879 using substantially water-free neutral solvents. The presence of water is suggested as a cause of byproducts, presumably aldehydes, according to established concepts. This probably accounts for the aldehyde production in the examples; however, the yields of the latter compounds were not commercially attractive.

A process for producing aldehydes by reacting ethylene with an aliphatic alcohol in the presence of moisture is described in Canadian Pat. No. 732,967. This is described as a two step process in which an acetal is first formed and then hydrolyzed to form the aldehyde, "considerable amounts" of water and acetal being present before hydrolysis and during distillation. This confirms findings in the inventors' laboratories that moisture in the system gives the results one would expect from the previously cited art; however, heretofore it has not been known that anhydrous t-butyl alcohol would permit high conversion of olefins to aldehydes and ketones.

Regardless of the mechanism involved, however, the foregoing workers in this field, and others, e.g. Shaeffer et al., U.S. Pats. Nos. 3,277,159, 3,290,362, 3,346,624 and 3,346,626, regard water as being essential in the reaction system for the production of acetaldehyde and aldehydes and ketones generally in good yields. As indicated by Moiseev et al., in anhydrous systems esters or ethers are produced.

Following the teachings of the prior art references, it was expected that when selected olefins, e.g. ethylene, propylene, etc. were catalytically reacted with $PdCl_2$ in anhydrous t-butyl alcohol the predominating product would be vinyl ether or an acetal. t-Butyl alcohol has recently become economically available in large quantities and it was desirable to produce commercially valuable and useful compounds from this chemical. According, experiments were run to determine if t-butyl vinyl ether could be produced economically and in good yield by reacting ethylene with t-butyl alcohol. Quite unexpectedly, the predicted product, t-butyl vinyl ether was not predominate and was detected only where the system was substantially neutral; i.e. where p-benzoquinone was used as a cooxidant. Since the reaction conditions excluded moisture in any form, it was not expected that acetaldehyde in any substantial quantity would be produced; however, quite unexpectedly very high yields of acetaldehyde resulted along with high yields of isobutylene. In view of the commercial importance of acetaldehyde and the unexpected and very high conversion efficiency of ethylene to acetaldehyde it was suggested that this process may be of substantial commercial value as a method for producing aldehydes and ketones and for producing high purity isobutylene. Accordingly, it is a principal object of this invention to provide a novel process for producing in high yield commercially valuable carbonyl compounds by reacting the corresponding olefin with t-butyl alcohol in the presence of a $PdCl_2$ catalyst.

SUMMARY OF THE INVENTION

The present invention constitutes a process for preparing aldehydes and ketones in an anhydrous palladium chloride catalyzed reaction of selected olefins with t-butyl alcohol, the process yielding isobutylene as a byproduct.

The production of carbonyl compounds according to the following formula constitutes a preferred embodiment of the process:

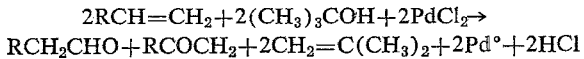

A more specific object of the invention constitutes the production of acetaldehyde according to the following equation:

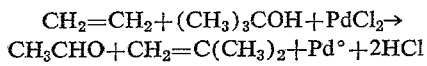

From the foregoing, it will be seen that the principal object of the invention is the provision of a novel and efficient process for producing acetaldehyde and carbonyl compounds generally.

An additional object of the present invention is to provide a process according to the conditions described hereinafter for producing acetaldehyde and carbonyl compounds.

Further and more specific objects of the invention will be apparent from the description of the invention and the examples thereof which follow.

DESCRIPTION OF THE PREFERRED EMBODIMENTS

The inventive process is practiced by reacting an olefin, such as ethylene, propylene, butylene, etc., under effectively anhydrous conditions with a $PdCl_2$ catalyst system at elevated temperatures in the presence of t-butyl alcohol. The reaction may be carried out in the range of from about 50° C. to about 150° C. but the temperature range of from about 90° C. to about 120° C. has been found to be most efficacious. The $PdCl_2$ catalyst system preferably includes a cooxidant which will be described in greater detail and illustrated by examples hereinafter but, preferably, consists of $CuCl_2$ in critical proportions, or a quinone, tetrachloro-p-benzoquinone being the preferred cooxidant.

As previously indicated the prior art strongly suggested that the reaction of ethylene and t-butyl alcohol in the presence of $PdCl_2$ would produce t-butyl vinyl ether or, perhaps, an acetal, 1,1-di-t-butoxyethane. Throughout the experiments leading and exploring the scope of the present invention the latter compound was undetected and all efforts to prepare it were unsuccessful. The teachings of the prior art suggesting the formation of acetals in the system described herein were confirmed. Diethyl acetals, dimethyl acetals, etc. were prepared and at the outset of the experiments leading to the present invention there appeared to be no reason why one would not expect to prepare the di-t-butyl acetal (1,1-di-t-butoxyethane). Further, since t-butyl vinyl ether is known and because it is also known that anhydrous reaction of olefins, e.g., ethylene, with alcohols produces vinyl ethers it was predicted and fully expected that at least a substantial vinyl ether production would result from optimized reaction conditions.

As indicated, the di-t-butyl acetal was never detected; however, t-butyl vinyl ether was detected in several experiments and all available evidence indicates that the carbonyl compounds produced result from a three step reaction system.

The first step is the production of a palladium chlorine-olefin complex illustrated in the following equation using ethylene as exemplary of the olefin:

The reaction apparently then proceeds by the formation of t-butyl vinyl ether according to the following equation:

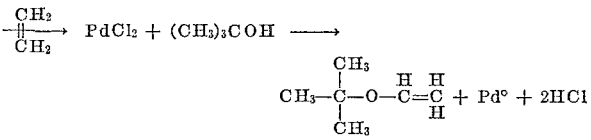

The product of this reaction, t-butyl vinyl ether, has been detected and, at lower reaction temperatures, may be present in the reaction system in significant amounts. However, at elevated temperatures or upon prolonged exposure to even moderate temperatures the product disappears, according to the following reaction:

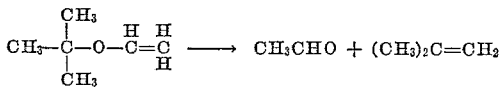

While t-butyl vinyl ether is the intermediate through which the carbonyl compound, e.g., acetaldehyde, and isobutylene are formed, as indicated by the foregoing reactions, the ether is never present in major proportions but decomposes nearly as rapidly as it is formed to the acetaldehyde and isobutylene.

The overall reaction of this invention is shown in the following equation.

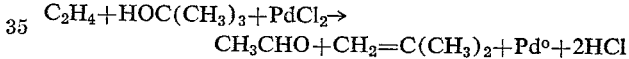

Considerable care must be exercised in carrying out the foregoing reaction if one is to avoid the hydrolysis type reaction which is illustrated in the prior art. It will be noted that the reaction, as illustrated by the preceding equation, nowhere involves water or water vapor and no hydrolysis occurs. However, if moisture is present in the system, direct hydrolysis of the olefin-$PdCl_2$ complex will result in the corresponding carbonyl compound and, in this sense, is not distinguishable from the prior art practices. It is contemplated, therefore, that the system be anhydrous to the extent that amounts of moisture or moisture vapor which would be effective to hydrolyze the olefin $PdCl_2$ complex directly to the corresponding carbonyl are absent. Stated differently, the system is effectively anhydrous in the sense that moisture in sufficient quantities to enter into the reaction is not present. It will be apparent that if any significant quantities of moisture are present the reaction scheme of the present invention may not occur or its effectiveness reduced as a method for producing carbonyl compounds and isobutylene.

It is also known that subjection of t-butyl alcohol, and other alcohols, to high temperatures and acid catalysts including Lewis acids may cause dehydration to occur. In the case of t-butyl alcohol, the dehydration products are water and isobutylene. Catalytic dehydration of t-butyl alcohol using a Lewis acid, such as substantial quantities of $CuCl_2$, may be used to produce isobutylene, water and t-butyl chloride. The present invention is to be distinguished from processes which proceed through the stepwise production of moisture by dehydration of t-butyl alcohol, or other alcohols followed by hydrolysis of an acetal or of the olefin-$PdCl_2$ complex. It will be apparent that such processes are in reality not different from known processes but include only the addition of the step for producing water from the particular alcohol.

The conditions and results of the process are illustrated in the following experiments which are merely exemplary of the invention and are not limiting in scope.

EXPERIMENTAL

A series of experiments, identified by number (000-00), were performed in a Fischer-Porter aerosol compatibility tube using 0.0007 mole palladium chloride and 0.025 mole p-benzoquinone and 0.35 mole of t-butyl alcohol. The reaction was carried out at 60° C. at an ethylene pressure of 150 p.s.i.g. for 1 hour. The reaction mixture was partially distilled into a pentane cold trap at −131° C. followed by a liquid nitrogen cold trap. The contents of the pentane cold trap were redistilled in a vacuum line to give 0.1658 gram of product which was analyzed. 15 percent of theoretical yield was obtained. Analysis by nuclear magnetic resonance indicated that acetaldehyde and isobutylene were present in about equal molar quantities. Acetone and t-butyl vinyl ether were present in minor amounts (519–48). The previous experiment was substantially duplicated (519–50) except that the reaction temperature was 90° C. In this case, distillation in the high vacuum line yielded 0.1821 gram of product. Again acetaldehyde and isobutylene were the major products and, in this case, had increased at the expense of t-butyl vinyl ether as compared with run 519–48.

This experiment was again duplicated (519–52), at a reaction temperature of 120° C. and with the addition of butyronitrile as a solvent. 0.0007 mole $PdCl_2$, 0.025 mole p-benzoquinone, 0.125 mole t-butyl alcohol and 0.36 mole of butyronitrile were weighed into the aerosol compatibility tube and the reaction was allowed to proceed at 120° C. for 1 hour. Fractional distillation on the high vacuum line gave 0.2218 gram of the product which was determined, by nuclear magnetic resonance, to consist mainly of acetaldehyde and isobutylene with small amounts of acetone. No t-butyl vinyl ether, however, was detectable in this sample.

Three additional runs were made using p-benzoquinone as the cooxidant with lithium chloride added to enhance the regeneration of the palladium chloride catalyst. At 90° C. (519–64) 81 percent acetaldehyde and only traces of isobutylene and t-butyl vinyl ether were obtained; however, t-butyl chloride was also present. At 120° C. (519–68) and at 140° C. (519–66) the yields were in excess of the theoretically expected yield for acetaldehyde and were, respectively, 41 percent and 181 percent of the expected isobutylene. In these runs, with the added lithium chloride, the low isobutylene yields at 90° C. and 120° C. indicate that the desired reaction did not occur but instead the conversion used the water introduced with lithium chloride and from dehydration of t-butyl alcohol to give the excessive yields of acetaldehyde. Further, it appears that the added lithium chloride suppressed the production of t-butyl vinyl ether. The last described experiments were also performed in the Fischer-Porter aerosol compatibility tube, using 0.0004 mole palladium chloride, 0.013 mole p-benzoquinone, 0.013 mole lithium chloride and 0.18 mole of t-butyl alcohol. Ethylene pressure was 150 p.s.i.g. Analyses were performed by nuclear magnetic resonance, mass spectrometry, and gas liquid chromatography.

Cupric chloride was also evaluated as a cooxidant. However, cupric chloride produces a substantial amount of t-butyl chloride as an undesirable side product. Furthermore, because of its Lewis acid characteristics, cupric chloride tends to dehydrate t-butyl alcohol to isobutylene. For example, a "blank" run (519–54) was made without ethylene. This run was conducted at 90° C. for 1 hour and yielded 168 percent of the theoretically calculable isobutylene. A similar run with ethylene (519–42) gave 88 percent acetaldehyde and 160 percent isobutylene. At a lower temperature, 50° C. (519–58) 22 percent acetaldehyde and 9 percent isobutylene were obtained.

All yields are determined by comparing the actual molar yield with the molar yield which would be predicted on the basis of complete conversion of the $PdCl_2$ and cooxidant in the system assuming no side reactions.

It will be apparent from the illustration given above that "side reactions" predominate when cupric chloride is used as the cooxidant. This was true even though butyronitrile was added as a solvent for the system (519–60).

A number of basic additives were tested with cupric chloride as a cooxidant in an effort to suppress the formation of excess isobutylene and the byproduct t-butyl chloride. Lithium chloride and a group of basic additives including cineole (1,4-epoxy-p-menthane), diphenylamine, pyridine, and sodium t-butoxide were tested. Lithium chloride apparently acts as a complexing agent for cupric chloride so as to diminish the Lewis acid properties of cupric chloride and, thereby, lessen the acid catalyzed dehydration of t-butyl alcohol to isobutylene and the formation of t-butyl chloride. In practice, however, the desired effects were not realized and, instead, the rate of reaction was suppressed. The basic additives inhibited the reaction, possibly because of complex formation or some other reaction which inactivated palladium chloride.

Cupric salts other than cupric chloride were also tested in the reaction system described. Cupric acetate, cupric acetylacetonate, cupric oxide, and cupric fluoride were tested, for example. Other cooxidants tested include ferric chloride, ferric acetate, lead oxide, lead tosylate, manganese dioxide and cobaltic acetylacetonate. Attempts to prepare lead(IV) tosylate by reaction of lead dioxide with p-toluene sulfonic acid, were unsuccessful; however, lead(II) tosylate was prepared, apparently by reduction during the reaction. Neither manganese dioxide nor cobaltic acetylacetonate, separately, showed any promise as a cooxidant. Yields of acetaldehyde were well below 10 percent of theoretical.

A highly preferred embodiment of the invention utilizes chloranil (tetrachloro-p-benzoquinone) as a cooxidant. Under similar conditions a run (610–67) was conducted using 0.0014 mole $PdCl_2$, 0.025 mole chloranil and 0.53 mole of t-butyl alcohol. The reaction was run for 1 hour at 90° C .and 150 p.s.i.g. ethylene. A sample of the offgas showed the presence of acetaldehyde and acetone and possibly isobutylene. The reaction mixture was fractionally distilled under vacuum using a dichloroethane slush at −35° C. and a pentane slush at −131° C. Products from the pentane trap were analyzed by mass spectroscopy. 37.9 percent of theoretical yield of acetaldehyde was achieved. Other products included acetone, crotonaldehyde, traces of t-butyl chloride, and acetic acid but no t-butyl vinyl ether was detected.

The preceding experiment was repeated (610–69) at 65° C. and a reaction time of 1 hour. Very little reaction occurred at this temperature and the reaction temperature was increased to 80° C. for 1 hour. Acetaldehyde yield was 30.3 percent of theoretical showing approximately the same distribution of products.

The process of this invention was carried out using propylene in t-butyl alcohol. 0.09 mole of propylene was reacted in the presence of 0.18 mole of t-butyl alcohol at a temperature of 90° C. for 1 hour. The products were distilled from the reaction tube into a pentane cold trap. Analysis indicated yields of 46 percent propionaldehyde and 4.6 percent acetone. (610–83). The foregoing experiment was repeated (610–84) using 1-butene. Methyl ethyl ketone was the major product but n-butyraldehyde was not detected in the reaction mixture.

It will be seen from the foregoing that a process has been described which permits the production of carbonyl compounds such as aldehydes and ketones, acetaldehyde in particular, directly from olefins in the absence of moisture. The mechanism for this reaction is not explainable on the basis of the teachings of the prior art and resulted from efforts initially to produce t-butyl vinyl ether, rather than aldehydes and ketones. However, in view of the commercial utility of these classes of compounds as intermediates in the production of phenol and urea condensation products, intermediates for drugs, perfumes, photographic dyes, solvents, etc., the commercial utility and value of the foregoing process will be apparent. It

We claim:

1. The process for preparing alkanols and alkanones comprising reacting an olefin selected from the group consisting of ethylene propylene and butylene under effectively anhydrous conditions, and at temperature of 50°–150° C., with PdCl$_2$ and t-butyl alcohol to form alkanols, alkanones and isobutylene.

2. The process of claim 1 wherein the olefin is ethylene and the carbonyl compound is acetaldehyde.

3. The process comprising preparing a catalyst system consisting of PdCl$_2$ and tetrachloro-p-benzoquinone, reacting on olefin selected from the group consistent of ethylene, propylene and butylene under effectively anhydrous conditions, and at a temperature of 50°–150° C. with said catalyst system and t-butyl alcohol to form alkanols, alkanones and isobutylene.

4. The process of claim 3 wherein the olefin is ethylene and the carbonyl compound is acetaldehyde.

References Cited

UNITED STATES PATENTS

| Number | Date | Name | Class |
|---|---|---|---|
| 3,381,037 | 4/1968 | Ohmae et al. | 260—604 AC |
| 3,641,162 | 2/1972 | Clark et al. | 260—604 AC |
| 3,121,124 | 2/1964 | Verdol | 260—682 |
| 3,546,278 | 12/1970 | Hayden et al. | 260—601 R X |
| 3,130,219 | 4/1964 | Pommer et al. | 260—601 R X |
| 2,736,743 | 2/1956 | Schmidle | 260—593 R X |
| 2,309,576 | 1/1943 | Converse | 260—593 R X |
| 3,140,303 | 7/1964 | Delamore et al. | 260—604 R X |
| 3,471,532 | 10/1969 | Young | 260—597 B X |

OTHER REFERENCES

Moiseev et al.: "Doklady Akademii Nauk, SSSR," Vol. 133, No. 2, pp. 377–380 (1960).

JOSEPH E. EVANS, Primary Examiner

D. B. SPRINGER, Assistant Examiner

U.S. Cl. X.R.

260—429 R, 435 R, 593 R, 597 B, 601 R, 604 R, 614 AA, 657, 682